US008756286B2

(12) United States Patent
Bayles et al.

(10) Patent No.: US 8,756,286 B2
(45) Date of Patent: Jun. 17, 2014

(54) ALTERNATE E-MAIL ADDRESS CONFIGURATION

(75) Inventors: Len Albert Bayles, Sandy, UT (US); Ernie Dainow, Toronto (CA); Derek Williams, Toronto (CA); Joseph Chiu Kit Yee, Toronto (CA)

(73) Assignee: Afilias Limited (IE)

( * ) Notice: Subject to any disclaimer, the term of this patent is extended or adjusted under 35 U.S.C. 154(b) by 765 days.

(21) Appl. No.: 12/921,762

(22) PCT Filed: Mar. 10, 2009
(Under 37 CFR 1.47)

(86) PCT No.: PCT/CA2009/000288
§ 371 (c)(1),
(2), (4) Date: Feb. 17, 2011

(87) PCT Pub. No.: WO2009/111870
PCT Pub. Date: Sep. 17, 2009

(65) Prior Publication Data
US 2011/0314109 A1    Dec. 22, 2011

Related U.S. Application Data

(60) Provisional application No. 61/035,367, filed on Mar. 10, 2008.

(51) Int. Cl.
*G06F 15/16*    (2006.01)
(52) U.S. Cl.
USPC .......................................................... 709/206
(58) Field of Classification Search
USPC .......................................................... 709/206
See application file for complete search history.

(56) References Cited

U.S. PATENT DOCUMENTS

| | | | |
|---|---|---|---|
| 6,292,770 B1 | 9/2001 | Zerber | |
| 6,754,694 B1 | 6/2004 | Hiura et al. | |
| 7,264,152 B2 * | 9/2007 | Tsuei et al. | 235/380 |
| 2002/0032740 A1 * | 3/2002 | Stern et al. | 709/206 |
| 2002/0120689 A1 | 8/2002 | Kang et al. | |
| 2003/0046353 A1 | 3/2003 | Chung et al. | |
| 2006/0242301 A1 * | 10/2006 | Horton et al. | 709/227 |

FOREIGN PATENT DOCUMENTS

WO    2007139552 A1    12/2007

* cited by examiner

*Primary Examiner* — Kostas Katsikis
(74) *Attorney, Agent, or Firm* — Marger Johnson & McCollom, PC

(57) ABSTRACT

A method is provided for transmitting an electronic mail (e-mail) message from a sender having a non-ASCII e-mail address to a recipient. Provided is an e-mail directory associated with a requested primary e-mail address, having a non-ASCII form, and a corresponding alternate e-mail address having an ASCII form. The alternate e-mail is generated from the primary e-mail address using a reversible encoding scheme having a one-to-one relationship. The e-mail message, the alternate e-mail address, and the primary e-mail address are transmitted to the recipient via a plurality of mail delivery elements. The alternate e-mail address is transmitted to a mail delivery element incapable of processing non-ASCII characters. The alternate e-mail address is for use by the mail delivery element to identify the sender and deliver the e-mail message to the recipient for display.

13 Claims, 2 Drawing Sheets

ALTERNATE E-MAIL ADDRESS CONFIGURATION

The present invention relates generally to electronic mail (e-mail) servers and specifically to electronic mail servers configured to handle non-ASCII e-mail address.

BACKGROUND

With the growth of computer networks, electronic mail (e-mail) has become a popular means for both personal and professional communication. Due, in large part, to the proliferation of the Internet, e-mail has become a standard means of communication for millions of people.

A sender uses a Mail User Agent (MUA) to create an e-mail message. Examples of MUAs include client-side applications such as Microsoft Outlook and Eudora as well as web-based applications such as Hotmail and Gmail. As is well known, the sender creates the e-mail message by entering one or more e-mail addresses, a message subject, a message body and may also attach files to the message. Each e-mail address comprises two portions. A first portion is referred to as a domain of the e-mail address and references a host name or domain name. The domain is typically located to the right of the '@' sign. A second portion is referred to as a username or account name and is used to identify an e-mail account at the domain. The username is typically located to the left of the '@' sign.

The MUA transmits the e-mail message to the recipient, or recipients, via a transmission e-mail server. The transmission e-mail server includes a Mail Submission Agent (MSA) and a Simple Mail Transfer Protocol (SMTP) server. The MSA contacts a Domain Name Server (DNS) to resolve the domain name of the e-mail address and obtain a corresponding Internet Protocol (IP) address. The SMTP server uses the obtained IP address to transmit the message to a receiving e-mail server for the recipient. The e-mail message maybe transmitted directly to the receiving e-mail server or it may be relayed via a plurality of Mail Transport Agents (MTAs).

The receiving e-mail server typically includes a MTA, a local delivery agent, local file storage, and a Post Office Protocol (POP) and/or Internet Message Access Protocol (IMAP) server to allow e-mail message retrieval. The recipient uses a MUA to retrieve the e-mail message from the receiving e-mail server.

In a typical ASCII environment all of the components in the network are capable of processing an ASCII e-mail address. However, e-mail addresses in the near future may contain foreign language (non-ASCII) characters. For example, Internationalized Domain Names (IDNs) are defined as Internet domain names that can potentially include non-ASCII characters. It is envisaged that international e-mail addresses may also include IDN usernames as part of such an e-mail address. Therefore, it is possible that the IDN usernames may also include non-ASCII characters.

In order to overcome this limitation, a method has been proposed that allows ASCII-only system components to "downgrade" an IDN e-mail address. Specifically, an alternate, ASCII e-mail address is defined by a user for an IDN e-mail addresses. Accordingly, when an ASCII-only system component receives an IDN e-mail address, the e-mail address is downgraded by replacing it with the alternate, ASCII e-mail address.

Although this solution enables e-mail messages having IDN e-mail addresses to be delivered using existing network components, it requires each user to establish and maintain two different e-mail boxes.

Accordingly, it is desirable to facilitate the delivery of e-mail messages having IDN e-mail addresses across a network that may include one or more components that are compatible only with ASCII e-mail address without the limitations of the prior art.

SUMMARY

In accordance with an aspect of the present invention there is provided a method for transmitting an electronic mail (e-mail) message from a sender having a non-ASCII e-mail address to a recipient, the method comprising the steps of establishing an e-mail directory associated with a requested primary e-mail address, having a non-ASCII form, and a corresponding alternate e-mail address having an ASCII form, the alternate e-mail being generated from the primary e-mail address using a reversible encoding scheme having a one-to-one relationship; transmitting the e-mail message and the primary e-mail address to the recipient via a plurality of mail delivery elements; transmitting the alternate e-mail address to a mail delivery element incapable of processing non-ASCII characters, the alternate e-mail address for use by the mail delivery element to identify the sender and deliver the e-mail message to the recipient for display.

In accordance with another aspect of the present invention there is provided a transmission electronic mail (e-mail) server configured to transmit an e-mail message having a non-ASCII e-mail address to a recipient, the transmission e-mail server comprising: an e-mail directory associated with a requested primary e-mail address, having a non-ASCII form, and a corresponding alternate e-mail address having an ASCII form, the alternate e-mail being generated from the primary e-mail address using a reversible encoding scheme having a one-to-one relationship; a Simple Mail Transfer Protocol (SMTP) server configured to resolve an Internet Protocol (IP) address of the recipient; and a mail submission agent (MSA) configured to: transmit the e-mail message and the primary e-mail address to the recipient via a plurality of mail delivery elements; transmit the alternate e-mail address to a mail delivery element incapable of processing non-ASCII characters, the alternate e-mail address for use by the mail delivery element to identify the sender and deliver the e-mail message to the recipient for display.

BRIEF DESCRIPTION OF THE DRAWINGS

An embodiment of the present invention will now be described by way of example only with reference to the following drawings in which:

FIG. 2b is a block diagram of an alternate e-mail directory structure to that shown in FIG. 2a.

DETAILED DESCRIPTION OF THE PREFERRED EMBODIMENT

Figure 1:
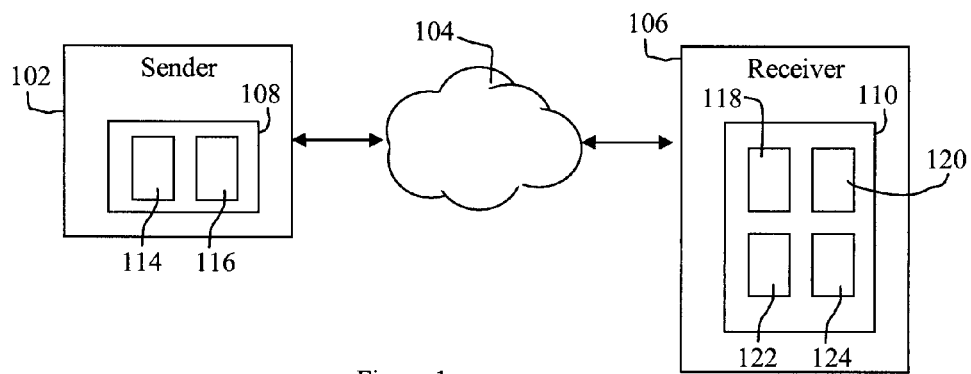
FIG. 1 is a block diagram of a standard network infrastructure (prior art)

For convenience, like numerals in the description refer to like structures in the drawings. Referring to FIG. 1, a block diagram illustrating a standard network infrastructure is illustrated generally by numeral 100. The network 100 includes a sender 102, a communication network 104, and a recipient 106. For ease of explanation, the sender 102 includes a transmission e-mail server 108 and the recipient 106 includes a reception e-mail server 110. The communication network 104 includes a plurality of network components required to facilitate communication between the transmission e-mail server 108 and the reception email server 110, as is known in the art.

The sender 102 is a computing device capable of transmitting an e-mail message, such as a personal computer, a notebook computer, a smart phone, or a personal digital assistant for example. The sender 102 provides its user with access a Mail User Agent (MUA). The transmission e-mail server 108 includes a Mail Submission Agent (MSA) 114 and a Simple Mail Transfer Protocol (SMTP) server 116.

As is known in the art, the transmission e-mail server 108 may be local to the sender 102, connected with the sender 102 via a local network (not shown), or hosted at a remote site and connected with the sender 102 via the communication network 104.

Similar to the sender 102, the recipient 106 is a computing device capable of receiving an e-mail message, such as a personal computer, a notebook computer, a smart phone, or a personal digital assistant (PDA) for example. The recipient 106 provides its user with access a MUA. The reception e-mail server 110 includes a MTA 118, a local delivery agent 120, local file storage 122 and a message retrieval server 124.

As is known in the art, the reception e-mail server 110 may be local to the recipient 106, connected with the recipient 106 via a local network (not shown), or hosted at a remote site and connected with the recipient 106 via the communication network 104.

The MTA 118 is configured to receive an e-mail message from the transmission e-mail server 108 either directly, or indirectly via a plurality of intermediate MTAs 118. The local delivery agent 120 is configured to persist the received e-mail message on the local storage 122 in a directory corresponding with the username. The message retrieval server 124 comprises one or more of a POP server, an IMAP server or a local host server, and is configured to deliver e-mail messages from the local storage 108 to the recipient 106 for display via the MUA.

In accordance with the present embodiment the transmission e-mail server 108 provides support for an IDN e-mail address in both its native IDN form and its corresponding ASCII form. In order to facilitate this feature, the transmission e-mail server is configured to automatically generate an alternate e-mail address that is the ASCII version of an IDN e-mail address when the IDN e-mail address is added to the server. A single e-mail box, or directory, is then created for both the IDN e-mail address and the alternate address.

In the present embodiment, Unix symbolic links are used to build a dual directory structure providing both the IDN and an ASCII reference to the e-mail box or directory.

It will be appreciated by a person of ordinary skill in the art that the sender 102 and recipient 106 are illustrated as providing one-way-communication for ease of explanation only. In most, if not all, implementations the sender 102 is also capable of receiving e-mail messages and the recipient 106 is also capable of transmitting e-mail messages. The respective e-mail servers 108 and 110 are configured accordingly.

Figure 2A:
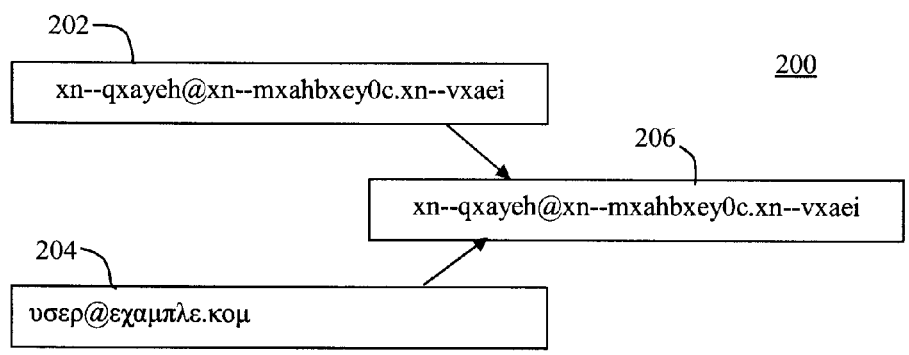
FIG. 2a is a block diagram of an e-mail directory structure.

Referring to FIG. 2*a*, a block diagram illustrating the structure of the e-mail directory in accordance with the present embodiment is shown generally by numeral 200. In the present embodiment, an e-mail box having a primary Greek e-mail address 202 is requested. An alternate ASCII e-mail address 204 corresponding with the primary e-mail address 202 is generated. An e-mail directory 206 is created using the alternate e-mail address 204 and the primary e-mail address 202 is linked to the created e-mail directory 206. In the present embodiment the generated ASCII e-mail directory 206 is used to allow for non-Greek language users/administrators to easily reference and maintain e-mail boxes.

Figure 2B:
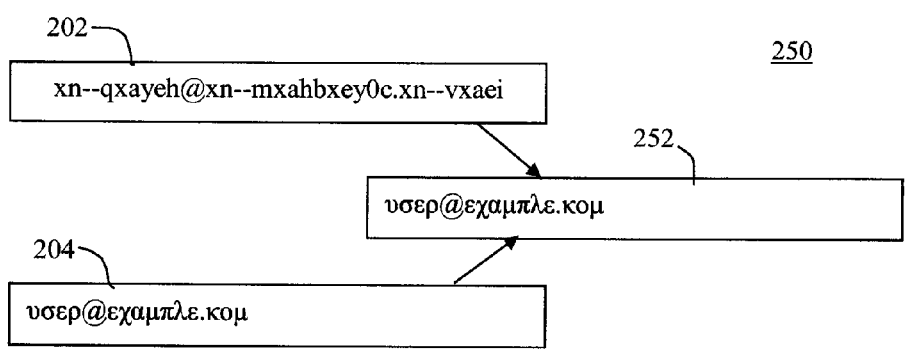

Referring to FIG. 2*b*, a block diagram illustrating the structure of the e-mail directory in accordance with an alternative embodiment is shown generally by numeral 250. In the present embodiment, an e-mail box having a primary Greek e-mail address 202 is requested. An alternate ASCII e-mail address 204 corresponding with the primary e-mail address 202 is generated. An e-mail directory 252 is created using the primary e-mail address 202 and the alternate e-mail address 204 is linked to the created e-mail directory 252. In the present embodiment the Greek e-mail directory 252 is used to allow for Greek language users/administrators to easily reference and maintain e-mail boxes.

In the present embodiment, the alternate email address is an encoded value of the primary e-mail address. The encoding method used is Punycode (RFC 3492), the same encoding method used for IDN with Unicode. Using the same encoding for domain name provides uniform encoding of the whole email address, and the encoded username satisfies the ASCII Compatible Encoding (ACE) requirement. The encoding both to ASCII and from ASCII is one-to-one.

Generally speaking, the formula of the alternate e-mail address auto generation can be viewed as:

Encode(UTF8-username@utf8-domain)=punycode (UTF8-encode-username)@punycode(UTF8-encode-domain)

The Punycode encoding of the domain name follows Internet Corporation for Assigned Names and Numbers (ICANN) guidelines in order to facilitate resolving the domain name and delivering the message to the intended destination.

However, the Punycode encoding of username does not have to follow ICANN guidelines. Accordingly, further flexibility is provided in encoding the username, which can be treated as one label or multiple labels separated by single character period "." (ASCII decimal code point 46).

The following describes different circumstances implementing the alternate e-mail configuration detailed above.

Figure 3:
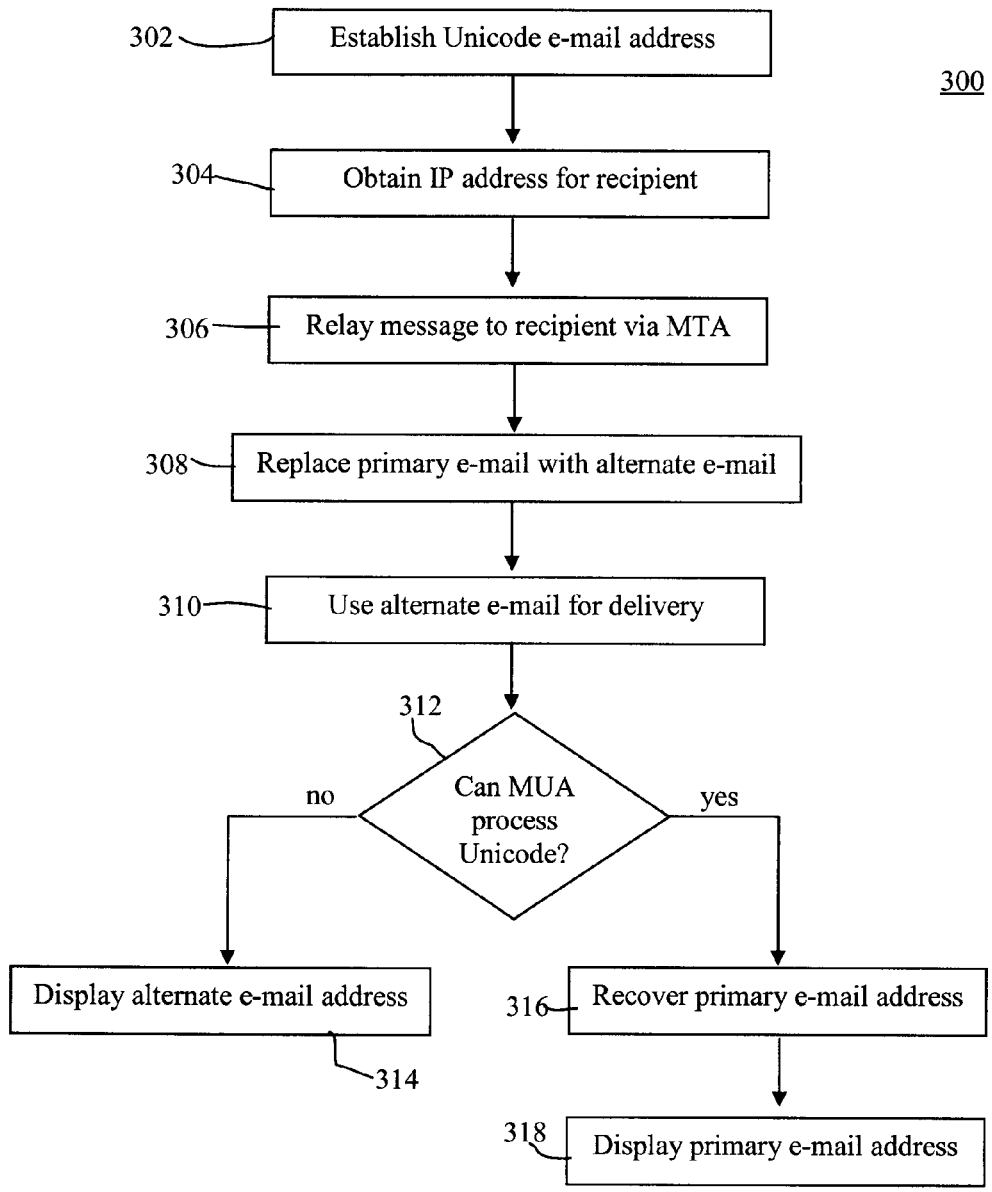
FIG. 3 is a flow chart illustrating transmission of an e-mail message from a Unicode e-mail address when one or more mail delivery elements cannot process Unicode.

Referring to FIG. 3, a flow chart illustrating the operation of a sample implementation is illustrated generally by numeral 300. The present embodiment illustrates transmitting an e-mail message from a sender 102 having a Unicode e-mail address to a recipient 106 incapable of processing Unicode. In the present example, the primary Unicode e-mail address (νσερ@εχαμπλε.κομ) is Greek.

At step 302, when the Unicode e-mail address is established, the e-mail server determines a corresponding alternate address (xn--qxayeh@xn--mxahbxey0c.xn--vxaei) in ASCII using Punycode. Both the primary e-mail address and the alternate e-mail address are configured to have the same e-mail box as previously described.

At step 304, the e-mail server obtains the IP address for the recipient 106 based on the destination e-mail address. The destination may comprise ASCII and or non-ASCII characters. However, for the purpose of the description it is assumed that the DNS can resolve a domain name having non-ASCII characters and return a corresponding IP address, as it is beyond the scope of the present invention.

At step 306, the e-mail message is relayed to a MTA 118 that cannot process a character set beyond ASCII, the MTA 118 cannot determine the origin of the e-mail message. In the present embodiment, both the primary and alternate e-mail addresses of the sender 102 are transmitted along with the e-mail message for identifying the sender 102. Accordingly, at step 308 the primary e-mail address of the sender 102 is disregarded and the alternate e-mail address of the sender 102 is employed. At step 310, the MTA 118 uses the alternate e-mail to identify the sender 102 and the e-mail message is delivered to the recipient 106.

At step 312 it is determined whether or not the MUA at the recipient 106 can process Unicode. If the MUA at the recipient 106 cannot process Unicode, the operation continues to step 314, and the e-mail message is displayed to the recipient 106 showing the alternate e-mail address (xn--qxayeh@xn--mxahbxey0c.xn--vxaei) of the sender 102.

The recipient 106 can send a reply e-mail message to the sender 102, which is transmitted using the alternate e-mail address of the sender 102. Because the alternate and primary e-mail address of the sender 102 share a common mailbox, the sender 102 will receive the reply e-mail message in the same mailbox as if the primary e-mail address had been used. Accordingly, there is no need for a user to maintain and monitor two separate mailboxes.

If, however, the MUA at the recipient 106 can process Unicode, and the alternate e-mail address is being used because of an intermediate MTA 118, for example, the operation continues to step 316. At step 316 Punycode decoding is applied to the alternate e-mail address and the primary e-mail address is obtained. At step 318, the e-mail message is displayed to the recipient 106 showing the primary e-mail address (νσερ@εχαμπλε.κομ) of the sender 102.

In the embodiment described above, the sender 102 transmits both the primary and alternate e-mail addresses initially with the message. In an alternate embodiment, the sender 102 only transmits the Unicode e-mail address and transmits the corresponding alternate address if an error message is received from the MTA 118.

Further, although the embodiment above specifically recites that the MTA 118 is the mail delivery element that is incapable of processing Unicode, other mail elements such as the local delivery agent 120, local file storage 122, message retrieval server 124 and MUA may be incapable of processing Unicode instead of, or in addition to, the MTA 118.

Yet further, although the description relates specifically to Unicode, other non-ASCII character sets may also be employed.

Using the foregoing specification, the invention may be implemented as a machine, process or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "software" and "application" as used herein are intended to encompass a computer program existent (permanently, temporarily, or transitorily) on any computer-usable medium such as on any memory device or in any transmitting device.

Examples of memory devices include, hard disk drives, diskettes, optical disks, magnetic tape, semiconductor memories such as FLASH, RAM, ROM, PROMS, and the like. Examples of networks include, but are not limited to, the Internet, intranets, telephone/modem-based network communication, hard-wired/cabled communication network, cellular communication, radio wave communication, satellite communication, and other stationary or mobile network systems/communication links.

A machine embodying the invention may involve one or more processing systems including, for example, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

Using the description provided herein, those skilled in the art will be readily able to combine software created as described with appropriate general purpose or special purpose computer hardware to create a computer system and/or computer subcomponents embodying the invention, and to create a computer system and/or computer subcomponents for carrying out the method of the invention.

Although preferred embodiments of the invention have been described herein, it will be understood by those skilled in the art that variations may be made thereto without departing from the spirit of the invention or the scope of the appended claims.

The invention claimed is:

1. A method for transmitting an electronic mail (e-mail) message from a sender having a non-ASCII e-mail address to a recipient, the method comprising the steps of:

establishing an a common e-mail inbox directory associated with a requested primary e-mail address, having a non-ASCII form, and a corresponding alternate e-mail address having an ASCII form, the alternate e-mail address being generated from the primary e-mail address using a reversible encoding scheme having a one-to-one relationship, both the primary e-mail address and the alternate e-mail address are linked as respective email addresses to the common e-mail inbox directory, wherein the alternate e-mail address is an encoded value of the primary e-mail address using the reversible encoding scheme, such that using the same said reversible encoding scheme provides a same encoding for the domain name to give a uniform encoding of the whole email address;

transmitting the e-mail message and both the primary e-mail address and the alternate e-mail address, either of the primary e-mail address or the alternate e-mail address for use in identifying the sender;

disregarding the primary e-mail address; and transmitting the alternate e-mail address to a mail delivery element incapable of processing non-ASCII characters, the alternate e-mail address for use by the mail delivery element to identify the sender and deliver the e-mail message to the recipient for display.

2. The method of claim 1, wherein the non-ASCII form is Unicode.

3. The method of claim 1, wherein the alternate e-mail address is transmitted upon receipt of an error message from one of the plurality of mail delivery elements.

4. The method of claim 1, wherein the e-mail message is displayed to the recipient using the alternate e-mail address to identify the sender.

5. The method of claim 1, wherein the reversible encoding scheme is used to convert the alternate e-mail address to the primary e-mail address and the e-mail message is displayed to the recipient using the primary e-mail address to identify the sender.

6. The method of claim 1, wherein the mail delivery elements include one or more of a mail transfer agent (MTA), a local delivery agent, local file storage, message retrieval server, or a mail user agent (MUA).

7. Memory comprising computer readable instructions which, when executed by a processor, cause the processor to implement the method of any one of claims 1 to 6.

8. A transmission electronic mail (e-mail) server configured to transmit an e-mail message having a non-ASCII e-mail address to a recipient, the transmission e-mail server comprising:
- a CPU coupled to a memory;
- a common e-mail inbox directory associated with a requested primary e-mail address, having a non-ASCII form, and a corresponding alternate e-mail address having an ASCII form, the alternate e-mail address being generated from the primary e-mail address using a reversible encoding scheme having a one-to-one relationship, both the primary e-mail address and the alternate e-mail address are linked as respective email addresses to the common e-mail inbox directory;
- a Simple Mail Transfer Protocol (SMTP) server configured to resolve an Internet Protocol (IP) address of the recipient; and
- wherein the SMTP server is further configured to:
  - transmit the e-mail message and both the primary e-mail address and the alternate e-mail address, either of the primary e-mail address or the alternate e-mail address for use in identifying the sender, wherein the alternate e-mail address is an encoded value of the primary e-mail address using the reversible encoding scheme, such that using the same said reversible encoding scheme provides a same encoding for the domain name to give a uniform encoding of the whole email address; and
  - transmit the alternate e-mail address to a mail delivery element incapable of processing non-ASCII characters, the alternate e-mail address for use by the mail delivery element to identify the sender and deliver the e-mail message to the recipient for display.

9. The transmission e-mail server of claim 8, wherein the reversible encoding scheme is used to convert the alternate e-mail address to the primary e-mail address and the e-mail message is displayed to the recipient using the primary e-mail address to identify the sender.

10. The transmission e-mail server of claim 8, wherein the mail delivery elements include one or more of a mail transfer agent (MTA), a local delivery agent, local file storage, message retrieval server, or a mail user agent (MUA).

11. The transmission e-mail server of claim 8, wherein the non-ASCII form is Unicode.

12. The transmission e-mail server of claim 8, wherein the alternate e-mail address is transmitted upon receipt of an error message from one of the plurality of mail delivery elements.

13. The transmission e-mail server of claim 8, wherein the e-mail message is displayed to the recipient using the alternate e-mail address to identify the sender.

* * * * *